United States Patent
Yadav et al.

(10) Patent No.: US 9,058,205 B2
(45) Date of Patent: Jun. 16, 2015

(54) AUTOMATICALLY PERFORMING OPERATIONS ON APPLICATIONS BASED ON DEPENDENCIES ON OTHER APPLICATIONS

(75) Inventors: Sunil Yadav, Maharashtra (IN); Arindam Mukherjee, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 716 days.

(21) Appl. No.: 13/279,864

(22) Filed: Oct. 24, 2011

(65) Prior Publication Data

US 2013/0104146 A1 Apr. 25, 2013

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/48 | (2006.01) |

(52) U.S. Cl.
CPC .......... *G06F 9/485* (2013.01); *G06F 2209/484* (2013.01)

(58) Field of Classification Search
None
See application file for complete search history.

(56) References Cited

U.S. PATENT DOCUMENTS

| 4,901,221 | A | 2/1990 | Kodosky et al. | 364/200 |
| 7,257,615 | B2* | 8/2007 | Eilers et al. | 709/203 |
| 7,426,715 | B2* | 9/2008 | Buskens et al. | 717/120 |
| 8,245,190 | B2* | 8/2012 | Buskens et al. | 717/120 |
| 8,539,492 | B1* | 9/2013 | Beckford et al. | 718/102 |
| 2002/0087734 | A1* | 7/2002 | Marshall et al. | 709/310 |
| 2002/0118220 | A1 | 8/2002 | Lui et al. | 345/709 |
| 2005/0034106 | A1 | 2/2005 | Kornerup et al. | 717/132 |
| 2005/0083834 | A1 | 4/2005 | Dunagan et al. | 370/221 |
| 2006/0136637 | A1 | 6/2006 | Goldick | 710/200 |
| 2006/0212864 | A1 | 9/2006 | Calahan | 717/167 |
| 2007/0143357 | A1 | 6/2007 | Chaudhri | 707/201 |
| 2009/0100447 | A1 | 4/2009 | Beynon et al. | 719/329 |

* cited by examiner

*Primary Examiner* — Emerson Puente
*Assistant Examiner* — Kacy Verdi
(74) *Attorney, Agent, or Firm* — Campbell Stephenson LLP

(57) ABSTRACT

A method, system, and computer-readable storage medium for automatically performing operations on applications based on dependencies on other applications are disclosed. A command to start a first application can be received. The first application is configured to use data provided by at least one another application. A determination is made whether the first application is configured to use data provided by a second application. This determining is performed in response to a receipt of the command. In response to a determination that the first application is configured to use data provided by the second application, execution of the second application is initiated.

16 Claims, 9 Drawing Sheets

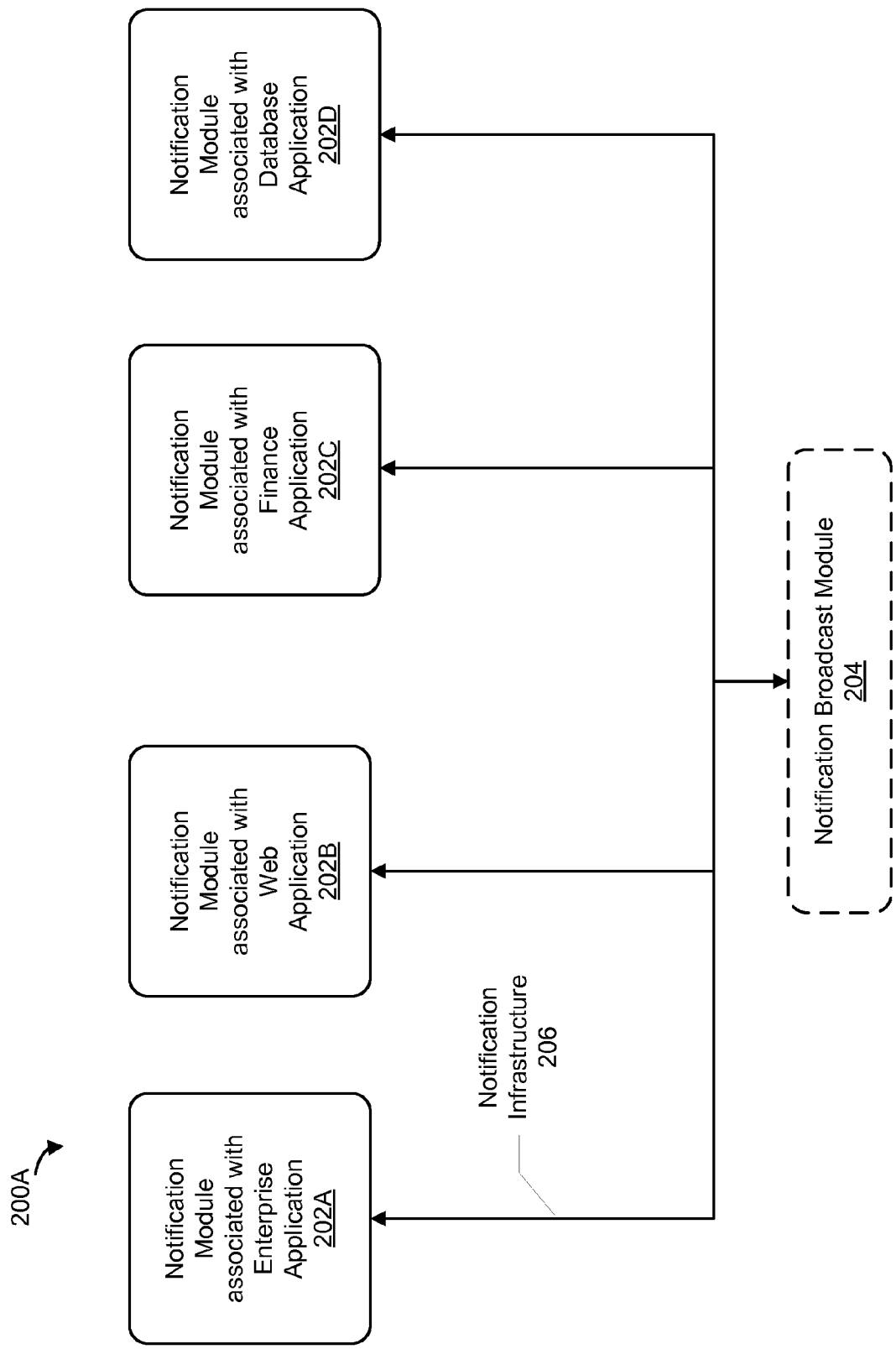

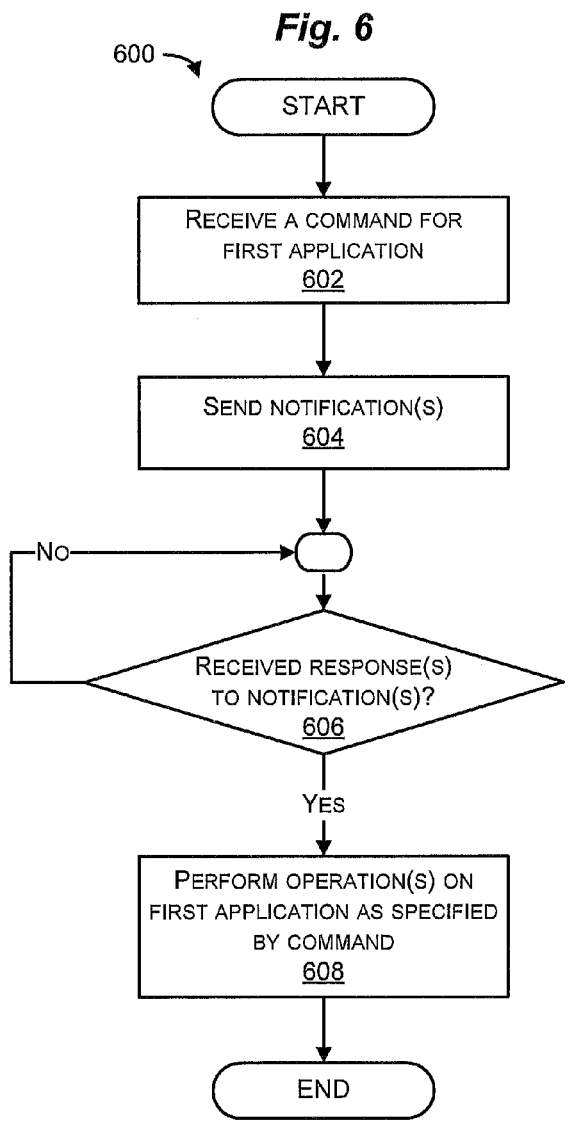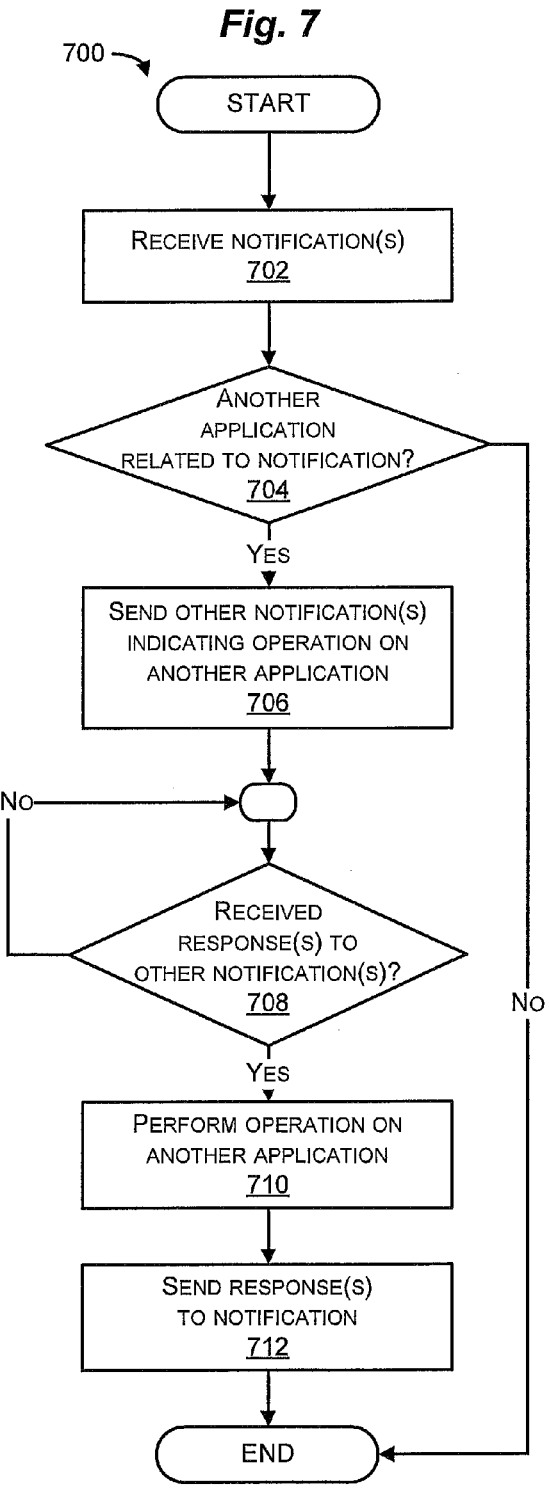

AUTOMATICALLY PERFORMING OPERATIONS ON APPLICATIONS BASED ON DEPENDENCIES ON OTHER APPLICATIONS

FIELD OF THE INVENTION

This application relates to managing execution of multiple applications. Particularly, this application relates to automatically performing operations on such applications based on their dependencies on other applications.

DESCRIPTION OF THE RELATED ART

A distributed computing system can include multiple systems that can each include one or more applications. Each such application can be a part of a multi-tier (n-tier) application, such as an enterprise application. For example, a three-tier application can include presentation, processing, and data management tiers. Each such tier can be a logically and/or physically separate process. The n-tier application architecture allows software developers to create flexible and reusable applications. For example, by using such an n-tier architecture, developers can modify or add application for one tier at a time, rather than need to rewrite or upgrade the entire application (i.e., an entire application corresponding to the n-tier application). In one example, a three-tier application can include a presentation tier, a processing tier, and a data tier.

For the three-tier application example, the presentation tier can be the topmost level of the multi-tier application. For example, for an enterprise application for on-line shopping, an application in the presentation tier can display information related to such services as browsing merchandise, purchasing, and shopping cart contents. This presentation application can communicate with applications in other tiers by various methods.

Continuing with this example, the application tier can perform various processing on data, such as on data that is accessed from a database tier application(s). This processed data can be passed to the presentation application. The third tier in this example can be a database tier. The database tier can include applications that access (e.g., store and retrieve) data from various database(s).

These applications implementing the enterprise application can have dependencies between each other. For example, the web application can depend on (e.g., use data that is generated and/or provided by) the finance application(s). The finance application(s) can be dependent on data provided by the database applications. Therefore, when the web application is executing, the finance application(s) should also be executing in order to provide data to the web application. Similarly, when the finance application(s) is executing, the database application(s) should also be executing to provide data to the finance application(s).

SUMMARY OF THE INVENTION

Various systems and methods for automatically performing operations on applications based on dependencies on other applications are disclosed. For example, one method involves receiving a command. The command is to start a first application. The first application is configured to use data provided by at least one another application. The method also includes determining whether the first application is configured to use data provided by a second application. This determining is performed in response to a receipt of the command. The method also involves, in response to a determination that the first application is configured to use data provided by the second application, initiating execution of the second application.

In some embodiments, the method includes initiating execution of the first application, where the initiating execution of the first application is performed in response to the execution of the second application. In some embodiments, the determining includes sending a notification, where the notification indicates the receipt of the command to start the first application. In some embodiments, a first entity operates the first application and a second entity operates the second application. The second entity determines, in response to a receipt of the notification, whether the second application is configured to provide the data for the first application. In some embodiments, the method includes determining whether the second application is configured to use other data provided by a third application. The method also includes, in response to a determination that the second application uses the other data provided by the third application, initiating execution of the third application, The initiating execution of the third application is performed prior to the initiating the execution of the second application. In some embodiments, the determining that the second application uses the other data from the third application is performed in response to a receipt of a secondary notification. The secondary notification indicates that the second application is to be executed.

In some embodiments, a third entity operates the third application. The third entity determines, in response to the receipt of the secondary notification, that the second application uses the other data from the third application. In some embodiments, the method also includes determining dependencies between a plurality of applications. The dependencies indicate that the first application applications is dependent on the second application at least by virtue of the first application using data provided by the second application. This determining of the dependencies is performed in response to the receipt of the command. In some embodiments, the initiating execution of the second application is based on the dependencies. In some embodiments, the method also includes applying, in response to the determination that the first application is configured to use data provided by the second application, a lock to the second application. The lock indicates that the second application is associated with the command to start the first application. The lock prevents another action to be initiated on the second application. The another action is an action associated with another command. The another command is a command other than the command to start the first application.

An apparatus is disclosed that comprises one or more processors, a first application, a command module, and a notification module. The first application is configured to be executed using the one or more processors. The command module is configured to receive a command to start the first application. The notification module is configured to send a notification. The notification indicates a receipt of the command to start the first application. The notification module is further configured to receive a response notification. The response notification indicates that a second application is executing.

In some embodiments, the first application is configured to be executed in response to receiving the response notification. The response notification further indicates that the second application is executing in response to the command module performing the sending of the notification. In some embodiments, the command module is further configured to receive a command to stop the first application. The notification module is further configured to send another notification. The another notification indicates a receipt of the command to stop the first application. The notification module is further configured to receive another response notification. The another response notification indicates that the third application is dependent on data provided by the first application. In some embodiments, the response notification further indicates that the third application is stopped in response to the notification module performing the sending of the another notification.

A computer readable medium is disclosed that contains program instructions that are executable by one or more processors. The program instructions are executable to receive a command, where the command is to start a first application. The program instructions are further executable to send a notification, where the notification indicates a receipt of the command. The program instructions are further executable to receive a response notification, where the response notification indicates that a second application is executing.

In some embodiments, the response notification further indicates that the first application is dependent on data from the second application. In some embodiments, the program instructions are further executable to execute the first application. The first application is executed in response to a receipt of the response notification. The response notification further indicates that the second application is executing in response to the sending of the notification. In some embodiments, the program instructions are further executable to receive a command to stop the first application. The program instructions are further executable to send another notification. The another notification indicates a receipt of the command to stop the first application. The program instructions are further executable to receive another response notification. The another response notification indicates that the third application is dependent on data from the first application. In some embodiments, the response notification further indicates that the third application is stopped in response to the sending of the another notification.

BRIEF DESCRIPTION OF THE DRAWINGS

The embodiments of the present application may be better understood, and its numerous objects, features, and advantages made apparent to those skilled in the art by referencing the accompanying drawings.

FIG. 2A is a block diagram illustrating a notification system including a notification infrastructure and notification modules, according to one embodiment.

FIG. 6 is a flowchart illustrating a method for performing an operation on an application as specified by a command, according to one embodiment.

FIG. 7 is a flowchart illustrating a method for processing a notification indicating a command for an application, according to one embodiment.

Figure 1:
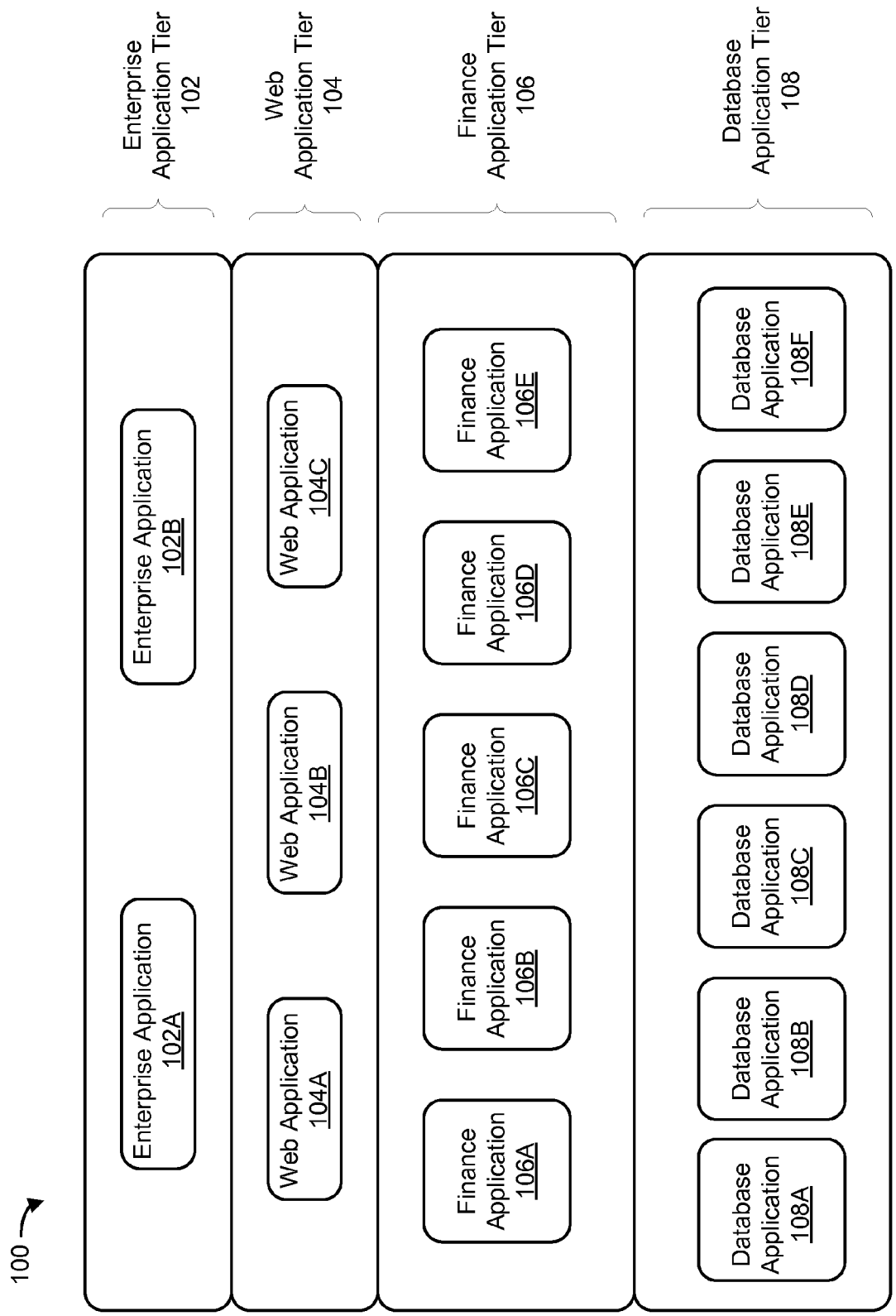
FIG. 1 is a block diagram illustrating multi-tier applications that includes an enterprise application tier, a web application tier, a finance application tier, and a database application tier, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present invention are directed to initiating execution of an application based on a dependency on another application. These applications can be a part of an enterprise application that is implemented using the n-tier architecture. The enterprise application can be a distributed application, and can include a web application, a finance application, and a database application. Execution of such an enterprise application should include execution of each of the web application, the finance application, and the database application. In one example, when initiating execution of such an enterprise application, a command to start a web application is received. However, in the enterprise application architecture, the web application may depend on data provided by one or more finance applications. Furthermore, each finance application may depend on data provided by one or more database applications.

When receiving the command to start the web application, the web application determines whether there is a finance application (and/or another application) that provides data used by this web application. In one example, a finance application that provides data used by the web application is identified. This finance application should be started before the web application can be started. Once the execution of the finance application has begun, the web application can be started. In one implementation, the web application can be started after the execution of finance application is completed. However, the finance application may itself be dependent on data provided by a database application (and/or another application). Therefore, this additional dependency is determined, and the database application is started (or the execution of the database application is completed) before the finance application can be started.

Similarly, when receiving other commands for an application (e.g., a command to stop a finance application) dependencies for this finance application are determined. For example, a web application that uses data that is provided by this finance application might be identified. Before the finance application can be stopped, the execution of the web application should be stopped first. Operations for commands other than starting and stopping execution of applications in the multiple-tier application model may be similarly performed, based on various dependencies between applications.

FIG. 1 is a block diagram illustrating an enterprise architecture 100 that includes an enterprise application tier, a web application tier, a finance application tier, and a database application tier, according to one embodiment. FIG. 1 shows an enterprise application tier 102 that includes enterprise applications 102A and 102B. FIG. 1 also shows a web application tier 104 that includes web applications 104A-104C. FIG. 1 also shows a finance application tier 106 that includes finance applications 106A-106E. FIG. 1 also shows a database application tier that includes database applications 108A-108F. It is noted that although FIG. 1 shows multi-tier applications (i.e., enterprise applications 102A-102B) that include three-tier applications 104-108, multi-tier applications can include applications from additional or fewer tiers, as desired.

Thus, enterprise applications 102A and 102B are multi-tier applications that include applications from web application tier 104, finance application tier 106, and database 108. Web applications 104A-104C can be web-based applications that present a graphical user interface (GUI) to a user. For example, a web application can include a web server software application. This web browser application can communicate with another computer to present a GUI in a web browser on that computer. Finance applications 106A-106E can include applications that process data and provide this data for use by web applications 104A-104C. Database applications 108A-108F can include applications that access database(s) and provide such data for use by finance applications 106A-106E.

In one embodiment, actual applications used by an enterprise application can dynamically change, and information about these changes may not be available for each application. In one embodiment, web application 104A may have information identifying finance application 106A that web application 104A depends on for data, but web application 104A may not have information identifying applications that finance application 106A is dependent for data. In another embodiment, while enterprise application 102A may have information identifying which of web applications 104A-104C are used by enterprise application 102A, web application 104A may not have information identifying which of finance application(s) (e.g., out of finance applications 106A-106E) are used by web application 104A. For example, web application 104A can use data from one or more of finance applications 106A-106E, but web application 104A may not have information identifying which of finance applications 106A-106E web application 104A is dependent for data. In yet another embodiment, web application 104A may not even have information identifying which application out of applications 104B, 104C, 106A-106E, and/or 108A-108F is a finance application. Thus, depending on the implementation, web application 104A may have information identifying applications web application 104A depends on, but not dependencies of those identified applications. As will be appreciated in light of the present disclosure, this dependency information can be used by other operations.

In one embodiment, upon receiving of a command, such as a command for operation to initiate execution, web application 104A (or rather, an entity that hosts this application, or a notification module associated with this application) may notify other applications 104B, 104C, 106A-106E, and/or 108A-108F of this command. The operation specified by this command is not performed with regard to web application 104A until responses are received to this notification. In one implementation, finance application 106A (or rather, an entity that hosts this application, or a notification module associated with this application) can respond to such a notification. This response can indicate that finance application 106A provides data that is used by web application 104A. This response can also indicate an operation that corresponds to the command can be initiated on web application 104A (e.g., execution of web application 104A can be initiated).

In one embodiment, in furtherance of the example above, applications other than 106A, i.e., applications 104B, 104C, 106B-106E, and/or 108A-108F (or rather, entities that host these applications, or notification modules associated with these applications), can respond with response(s) indicating that none of these applications 104B, 104C, 106B-106E, and/or 108A-108F provide data that is used by web application 104A. In another embodiment, applications other than 106A, i.e., applications 104B, 104C, 106B-106E, and/or 108A-108F (or rather, entities that host these applications, or notification modules associated with these applications), can simply not respond to these notifications sent by web application 104A. In this embodiment, a time-out, or another mechanism, can be used to determine that these applications other than 106A, i.e., applications 104B, 104C, 106B-106E, and/or 108A-108F, do not provide data that is used by web application 104A.

In one embodiment, an application (or rather, an entity that hosts this application, or a notification module associated with this application) that receives a notification may determine whether it provides data that is used by the application that sent this notification. In accordance with the above example, finance application 106A (or rather, an entity that hosts this application, or a notification module associated with this application) may determine, upon receiving of the notification from web application 104A, that it provides data that is used by web application 104A (i.e., that web application 104A is dependent on finance application 106A). However, before sending a response back to web application 104A indicating this dependency, finance application 106A (or rather, an entity that hosts this application, or a notification module associated with this application) may need to determine whether it is itself dependent on another application. In one embodiment, finance application 106A (or rather, an entity that hosts this application, or a notification module associated with this application) may send one or more additional notifications, each indicating that finance application 106A would like to perform an operation associated with the received notification, or indicating a possible dependency of finance application 106A.

In similar fashion to that described above, another application (e.g., database application 108A) (or rather, an entity that hosts this application, or a notification module associated with this application) can determine, upon receiving of the additional notification from finance application 106A, that it provides data that is used by finance application 106A (i.e., that finance application 106A is dependent on database application 108A). Database application 108A (or rather, an entity that hosts this application, or a notification module associated with this application) can then determine that there are no other applications that it is dependent on (i.e., no other applications that provide data used by database application 108A). Database application 108A can then be executed, i.e., in response to receiving the additional notification from finance application 106A. Once execution of database application 108A has begun, a response can be sent to finance application 106A that indicates execution of database application 108A. Once finance application 106A receives this response, finance application 106A can then be executed. Once execution of finance application 106A has begun, another response can be sent to web application 104A that indicates that indicates execution of finance application 106A. Once web application 104A receives this additional response, web application 104A can then be executed, as indicated by an operation for the received command. It is noted that in some embodiments, a response can be sent upon a successful execution of an application, such as a successful execution of a finance application, also indicating that any dependencies of this finance application are also satisfied.

As a result, the dependencies of each of the applications of enterprise application 102A can be preserved, even if the dependencies of web application 104A are changed from one execution to another. By using the notification system described herein, the structure of an enterprise application can be dynamically changed, without applications having information identifying all of the dependencies before each execution of such enterprise application. In one embodiment, each application may only have information identifying another application(s) this each application is dependent on, but not information identifying applications these another application(s) are dependent on. For example, web application 104A may have information identifying dependence on finance application 106A. However, web application 104A would not have information identifying dependencies of finance application 106A. In another embodiment, each application would not even information identifying another application(s) this each application is dependent on.

The method described herein can be applied to other commands for each enterprise application 102A-102B. For example, during execution of enterprise application 102A (i.e., when web application 104A, finance application 106A, and database application 108A are executing), a command is received to stop execution of finance application 106A. However, in one embodiment, during execution of enterprise application 102A, execution of finance application 106A can be stopped after any applications that are dependent on finance application 106A are stopped first. Therefore, finance application 106A (or rather, an entity that hosts this application, or a notification module associated with this application) may send notifications indicating of the command for stopping execution of finance application 106A. Applications (or rather, entities that hosts each such application, or notification modules associated with such applications) that are dependent on finance application 106A can respond, such as web application 104A.

For example, web application 104A can, upon receiving the notification from finance application 106A, determine whether there are any applications that are dependent on web application 104A. This determination can be made by sending additional notifications. Each of these additional notifications can indicate intent to stop execution of web application 104A, and/or inquire whether there are any applications that are dependent on web application 104A. In another embodiment, this determination can be made without sending additional notifications. Once web application 104A (or rather, an entity that hosts this application) determines that there are no other applications that are dependent on web application 104A, the execution of web application 104A can be stopped, while sending a response to finance application 106A. Once finance application 106A receives this response, the execution of finance application 106A can stopped. In one embodiment, for the stop execution command described herein, another application (e.g., database application 108A) that provides data that is used by the application being stopped (e.g., finance application 106A) is not necessarily affected by this stop execution command.

FIG. 2A is a block diagram illustrating a notification system 200A that includes a notification infrastructure and notification modules, according to one embodiment. The notification system can be used to communicate notifications and/or responses by multi-tier applications, such as described in FIG. 1.

The notification system includes notification modules 202A-202D, a notification broadcast module 204, and a notification infrastructure 206. Notification module 202A is associated with an enterprise application, such as enterprise application 102A. Notification module 202B is associated with a web application, such as web application 104A. Notification module 202C is associated with a finance application, such as finance application 106A. Notification module 202D is associated with a database application, such as database application 108A. Notification infrastructure 206 facilitates sending and receiving of notifications (and responses) between notification modules 202A-202D.

Notification broadcast module 204 is optional, and may be used in some embodiments. In one embodiment, notification module 202B can send notifications, such as notifications indicating that its associated web application 104A is to be started as indicated by a received command, to all other notification modules, e.g., notification modules 202A, 202C, and 202D. In another embodiment, notification module 202B can send such a notification to notification broadcast module 204. Notification broadcast module 204, in response to receiving such a notification from notification module 202B, can sent additional notifications (e.g., substantially similar notifications) to notification modules 202A, 202C, and 202D. In one embodiment, each of notification modules 202A-202D can also receive responses from other notification modules 202A-202D, such as indicating that a respective application has performed an operation.

Figure 2B:
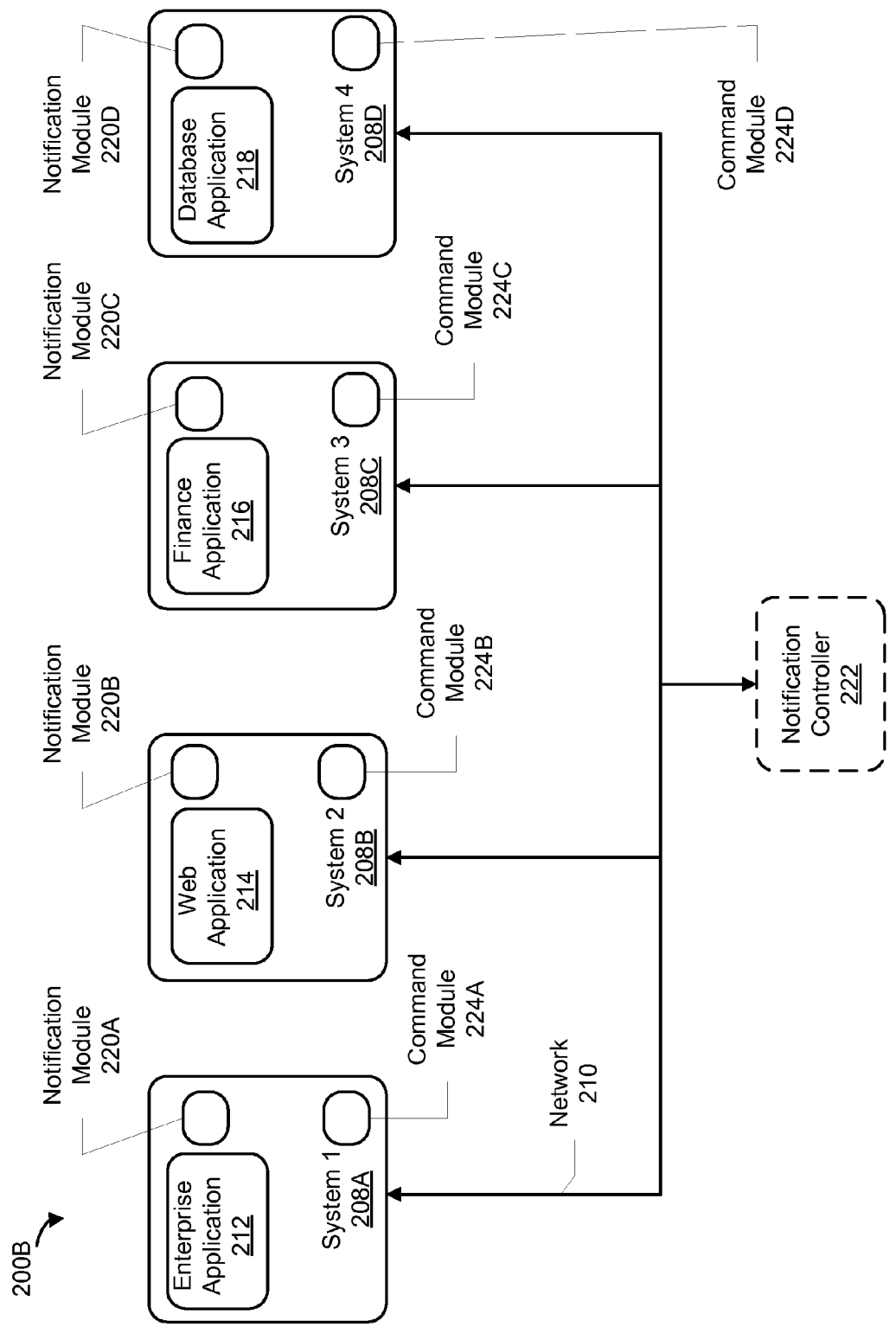
FIG. 2B is a block diagram illustrating an example implementation of a notification system, according to one embodiment.

FIG. 2B is a block diagram illustrating an example network system 200B of a notification system, according to one embodiment. Network system 200B includes systems 208A-208D, each of which can communicate with other systems 208A-208D using network 210. System 208A includes an enterprise application 212, system 208B includes a web application 214, system 208C includes a finance application 216, and system 208D includes a database application 218. Furthermore, each of systems 208A-208D includes a respective notification module 220A-220D, as well as a respective command module 224A-224D. Network system 200B can also include a notification controller 222.

In one embodiment, one or more of systems 208A-208D can be implemented using a virtual machine. Each virtual machine may be a software implementation of a physical computer that executes computer instructions in the manner of physical computer hardware. A hypervisor (not shown) can be implemented in software and/or hardware, and may provide each system 208A-208D the ability to concurrently support virtual machines. Hypervisor may provide such ability by coordinating the distribution of computer resources (e.g., processing power, memory, etc.) among virtual machines, so that virtual machines operate similarly to physical computers. Virtual machines may be implemented in software and execute computer instructions similarly to physical hardware. Each virtual machine may be able to operate as if the host computer were solely under that virtual machine's control, and so share the host computer system's resources. For example, one or more of systems 208A-208D can be implemented using a virtual machine, and each such virtual machine may execute a respective application, notification module, and a command module.

In one embodiment, each system 208A-208D can host a respective application 212-218. Systems 208A-208D can each include an operating system and a service group that is associated with a respective application 212-218. In one embodiment, a service group (not shown) can be a data structure for each application that includes data, such as dependencies, of each application. However, each such service group may only include a portion of dependencies of each enterprise application. It is noted that in one embodiment, enterprise application 212 can itself be a multi-tier application, and thus can include multiple distributed applications, such as applications 214-218. In other words, execution of enterprise application 212 can include execution of each of applications 214-218.

Each command module 224A-224D can receive one or more commands, such as commands to start or stop execution, commands to pause execution, among others. A command module can be implemented as one or more of software, hardware, or combination thereof. In one embodiment, a command module can initiate an operation, as specified by a received command, on an associated application.

For example, command module 224B can initiate starting execution of web application 214, as indicated by a received command, but only after determining dependencies on other applications. In another embodiment, a command module can communicate with a software entity, such as an operating system, of a system to perform operation that is specified by a received command. For example, command module 224B can communicate with an operating system of system 208B to initiate execution of web application 214, as specified by a received command.

Notification modules 220A-220D can send notifications and/or receive responses, such as those sent/received for the purpose of determining dependencies between applications 212-218. Notification modules 220A-220D can implement notification modules 202A-202D of FIG. 2A. In one embodiment, each notification module 220A-220D can communicate with a respective command module 224A-224D. For example, command module 224B can receive a command to initiate execution of web application 214. Prior to initiating execution of web application 214, command module 224B can communicate with notification module 220B, informing notification module 220B of this received command and/or intent to initiate execution of web application 214. In one embodiment, web application 214 is not executed (as indicated by the command) until one or more responses are received (e.g., by notification module 220B). Each such response can indicate that another system, e.g., system 208C, contains an application (e.g., finance application 216) that can provide data that is used by web application 214. Each such response also indicates that this application on another system provides data that web application 214 is dependent on.

Notification controller 222 is an optional part of system 200B. Notification controller can implement notification broadcast module 204 of FIG. 2A. In one embodiment, notification controller 222 can receive, send, and/or route notifications between notification modules. For example, notification module 220B can send a notification to notification controller 222. Next, notification controller can broadcast this notification to all the systems and/or notification modules in system 200B. Notification module 220C can send a response back directly to notification module 220B, and/or notification module 220C can send a response back to notification controller 222. Next, notification controller 222 can send this response to notification controller 220B. In one embodiment, notification controller 222 can employ flags that indicate whether a certain application is executing (or alternatively, has executed) to provide data for use by another application.

For example, system 208C can send the response back to system 208B upon execution of finance application 216. Once execution of finance application 216 has begun, system 208C can provide data that is used by web application 214, such as over network 210. In one embodiment, applications, e.g., web application 214 and finance application 216, can also access data that is located at a common location, e.g., a common data store. In this embodiment, system 208C can send a response back to system 208B once finance application 216 has performed a required operation on data at this common location. Accordingly, system 208B does not perform an operation on web application 214 until system 208B receives this response.

Figure 3:
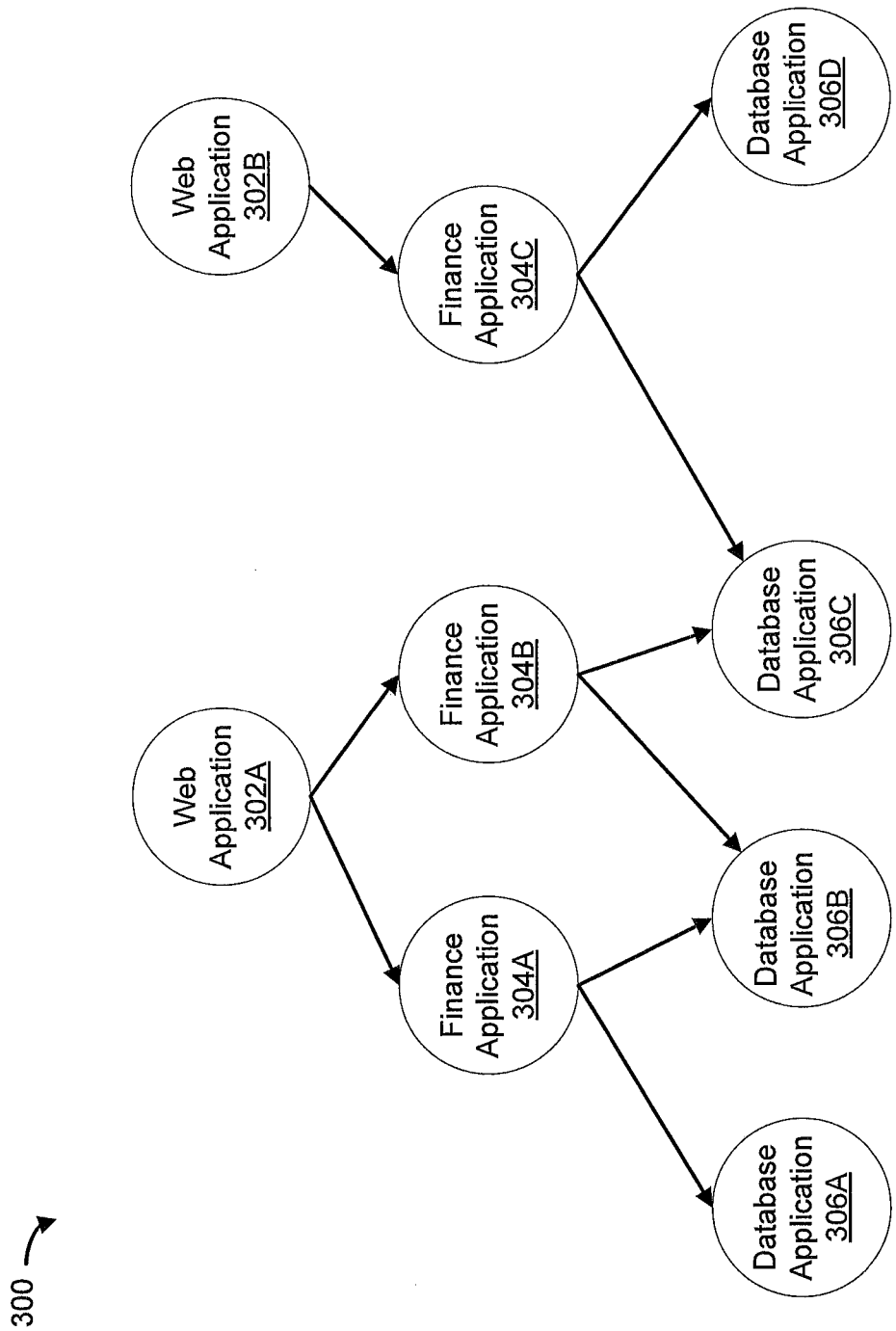
FIG. 3 is a block diagram of dependency graph showing dependencies of various applications, according to one embodiment.

FIG. 3 is a block diagram of dependency graph showing dependencies 300 of various applications, according to one embodiment. FIG. 3 shows dependencies 300 between web applications 302A and 302B, finance applications 304A-304C, and database applications 306A-306D. As shown, web application 302A is dependent on finance applications 304A and 304B. Web application 302B is dependent on finance application 304C. Finance application 304A is dependent on database applications 306A and 306B. Finance application 304B is dependent on database applications 306B and 306C. Finance application 304C is dependent on database applications 306C and 306D. Database applications 306A-306D are not dependent on any other applications.

In one embodiment, upon a system associated with web application receiving a command to initiate execution, such as a command module 224B of system 208B receiving a command to initiate execution of web application 214, web application is not executed until system(s) associated with application(s) this web application depends on have indicated (e.g., via a response) that they are ready. In the example shown in FIG. 3, system(s) associated with both finance applications 304A and 304B would indicate, e.g., via a response to system 208B, that they are ready to provide data that web application 302 is dependent on. However, system(s) associated with each finance application 304A and 304B would not make this indication (to web application 302A) until system(s) associated with database applications 306A-306C would first indicate that they are ready to provide data that finance applications 304A and 304B are dependent on. In one embodiment, finance applications 304A and 304B are executed before these indications are made to web application 302. In another embodiment, finance applications 304A and 304B operate on data in a common location before these indications are made to web application 302A.

In one embodiment, upon the system associated with web application 302A receiving a command to initiate execution, a lock is applied on each application in the dependency for that web application. In this example, a lock would be applied to web application 302A, finance applications 304A and 304B, and database applications 306A-306C. This lock can be applied to each of these applications during propagation of notifications from web application 302A to database applications 306A-306C. As a result, an application having a lock cannot be accessed by notifications and/or operations that are associated with another command. In one embodiment, a service group for each application can implement a lock for that application. In one embodiment, a lock may prevent a given application from being accessed by a different type of an operation. For example, database application 306C can be locked by finance application 304B and still be used by (and respond with responses to notifications from) finance application 304C related to an operation for initiating execution of database application 306C. However, this lock would prevent other operations (such as stopping, pausing, etc.) from being applied to database application 306C.

Figure 4:
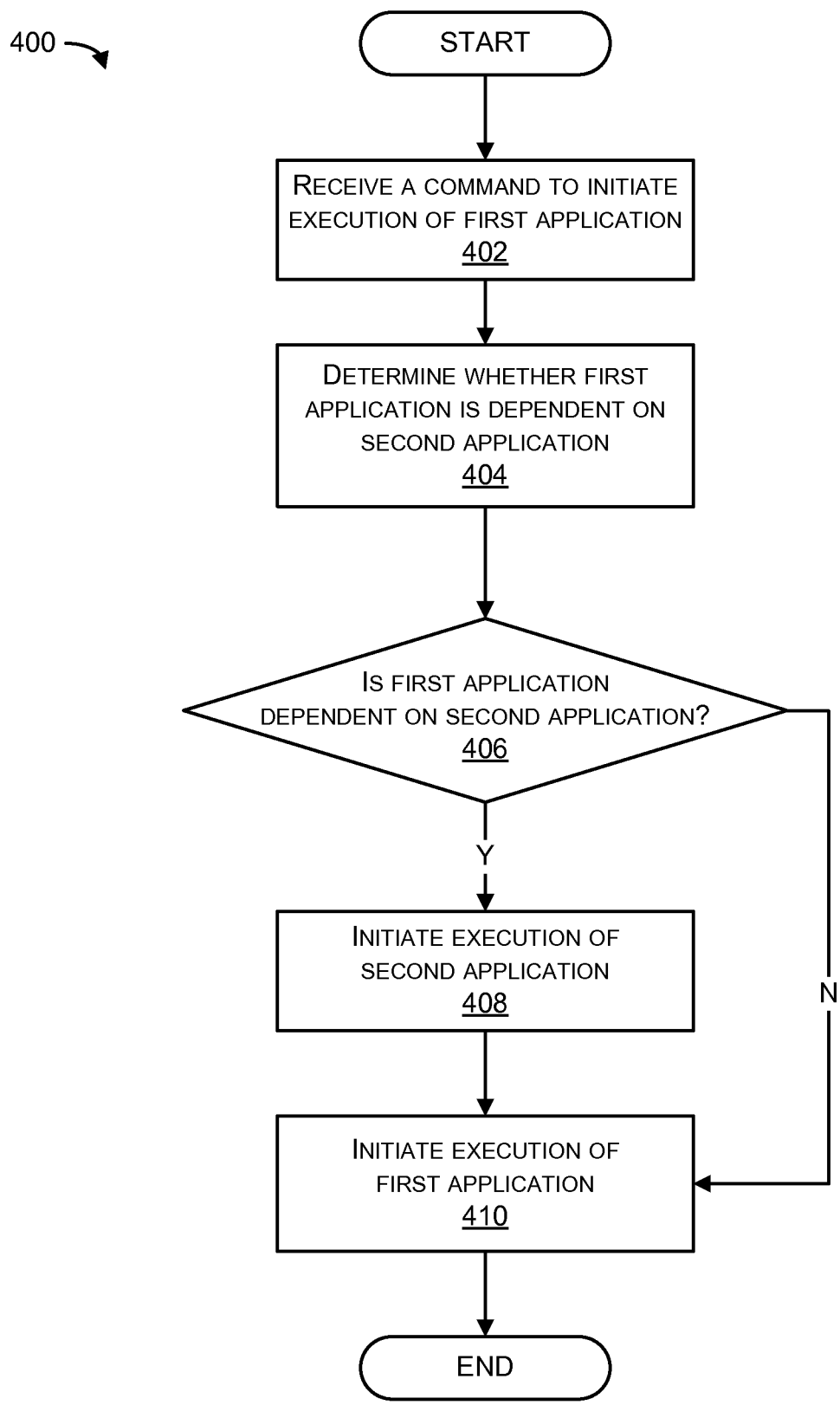
FIG. 4 is a flowchart illustrating a method for initiating execution of an application based on a dependency on another application, according to one embodiment.

FIG. 4 is a flowchart illustrating a method 400 for initiating execution of an application based on a dependency on another application, according to one embodiment. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 400 is described with reference to variations of the elements described in connection with FIGS. 1-3.

In 402, a command is received to initiate execution of a first application. For example, with reference to FIG. 2B, command module 224B of system 208B can receive a command to execute web application 214. However, system 208B does not execute web application 214 until it determines whether web application 214 has any dependencies.

In 404, a determination is made whether the first application is dependent on a second application. For example, with reference to FIG. 2B, system 208B can make this determination, such as by sending one or more notifications. In one embodiment, system 208B can also communicate with another system, such as system 208C, to determine dependencies for application 214. In accordance with this embodiment, system 208B can communicate with system 208C and/or other systems to determine at least a portion of dependencies for web application 214. For example, notification module 220B can wait on receiving a response (e.g., from another notification module and/or a notification controller), or wait for a time-out when making this determination.

In 406, if the first application is dependent on the second application, method 400 executes element 408. If the first application is not dependent on the second application, method 400 executes element 410.

In 408, execution of the second application is initiated. In one embodiment, finance application 216 is executed by system 208C in response to receiving a notification (such as from notification module 220B and/or notification controller 222). In another embodiment, once execution of finance application has begun, a response is sent to system that hosts the web application. As will be appreciated in light of the present disclosure, execution of the finance application itself may be dependent on other applications.

In 410, execution of the first application is initiated. In one embodiment, web application 214 is executed in response to receiving a response indicating that finance application (that provides data that is used by web application 214) is executing.

Figure 5:
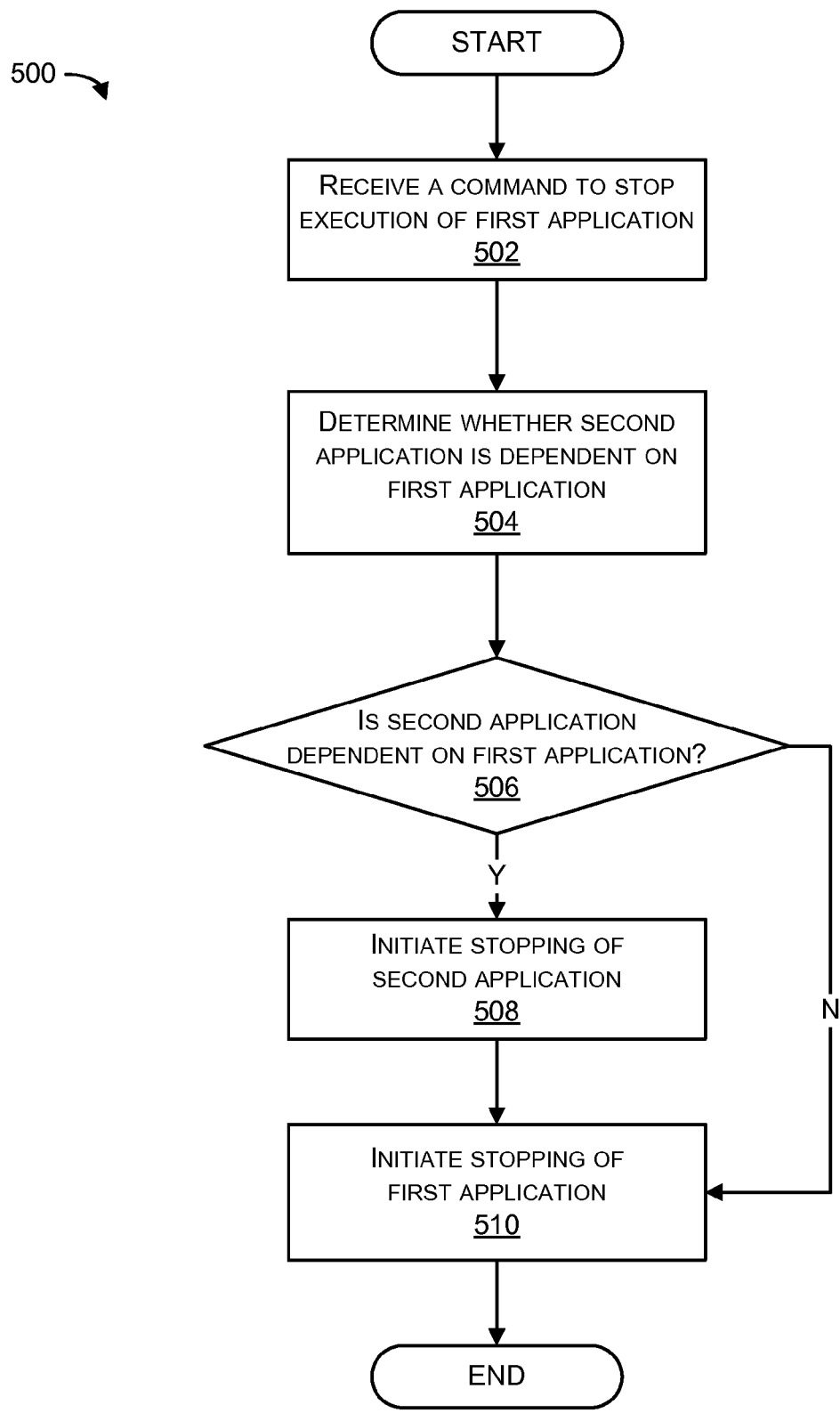
FIG. 5 is a flowchart illustrating a method for initiating stopping of an application based on a dependency on another application, according to one embodiment.

FIG. 5 is a flowchart illustrating a method 500 for initiating stopping of an application based on a dependency on another application, according to one embodiment. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 500 is described with reference to variations of the elements described in connection with to FIGS. 1-3.

In 502, a command is received to stop execution of the first application. For example, with reference to FIG. 2B, command module 224C of system 208C can receive a command to stop finance application 216. However, system 208C does not stop the execution of finance application 216 until it determines whether there are applications that are dependent on finance application 216.

In 504, a determination is made whether a second application is dependent on the first application. For example, with reference to FIG. 2B, system 208C can make this determination, such as by sending one or more notifications. In one embodiment, system 208C can also communicate with another system, such as system 208B, to determine dependencies for application 216. In accordance with this embodiment, system 208C can communicate with system 208B and/or other systems to determine at least a portion of dependencies for finance application 216. For example, notification module 220C can wait on receiving a response (e.g., from another notification module and/or a notification controller), or wait for a time-out when making this determination.

In 506, if the second application is dependent on the first application, method 500 executes element 508. If the second application is not dependent on the second application, method 500 executes element 510.

In 508, stopping of the second application is initiated. In one embodiment, web application 214 is stopped by system 208B in response to receiving a notification (such as from notification module 220C and/or notification controller 222). In one embodiment, once web application has stopped, a response can be sent to system that hosts the finance application. Also, execution of the web application itself may be dependent on other applications.

In 510, stopping of the first application is initiated. In one embodiment, finance application 216 is stopped in response to receiving a response indicating that web application (that uses data that is proved by finance application 214) has stopped.

FIG. 6 is a flowchart illustrating a method for performing an operation on an application as specified by a command, according to one embodiment. Method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 600 is described with reference to variations of the elements described in connection with to FIGS. 1-3.

In 602, a command is received for a first application. With reference to FIG. 2B, a command is received at command module 224B of system 208B. The command can be one of a start execution command, a stop execution command, or a pause execution command, among others. The command can refer to an operation that is to be performed on the first application, such as on web application 214. This operation is not performed on the first application until dependencies are determined, as described below.

In 604, one or more notifications are sent. In one embodiment, this notification can indicate the command for the first application. In another embodiment, this notification can indicate that an operation is to be performed on the first application, without indicating the command (that specifies this operation) itself. In yet another embodiment, this notification can inquire whether there is an application that that the first application is dependent on, without indicating the operation and/or the command. For example, a notification can be sent that indicates a start execution command for web application 214. As described herein, a notification can be sent by notification module 220B to notification controller 222 (which can then propagate this notification to other systems), and/or notification module 220B can send notifications to other systems. Depending on implementation, notification module 220B may re-send these notification(s) to ensure that other notification module(s) were given enough time to respond.

In 606, method 600 waits on one or more responses to notification(s). For example, notification module 220B can wait on response(s) from other systems (or notification controller 222). In other words, element 606 waits for determination of dependencies of the first application. Notification module 220B may use a time-out, or another mechanism, to ensure that system 208B does not wait too long to perform the operation that is specified by the received command. For example, notification module 220B may wait for a pre-determined amount of time before performing this operation. For the purpose of the flowchart of method 600, a time-out, or another mechanism, may be interpreted by notification module 220B as a response to the notification.

In 608, if response(s) to the notification are received, then the operation(s) are performed on the first application as specified by the command. For example, once response(s) to the notification are received by notification module 220B, system 208B can initiate execution of web application 214.

FIG. 7 is a flowchart illustrating a method for processing a notification indicating a command for an application, according to one embodiment. Method 700 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 700 is described with reference to variations of the elements described in connection with to FIGS. 1-3.

In 702, a notification is received. In one embodiment, this notification can indicate the command for the first application. In another embodiment, this notification can indicate that an operation is to be performed on the first application, without indicating the command (that specifies this operation) itself. In yet another embodiment, this notification can inquire whether there is an application that that the first application is dependent on, without indicating the operation and/or the command. For example, with reference to FIG. 2B, a notification can be received by notification module 220C of system 208C. This notification can be sent by notification module 220B and/or notification controller 222.

In 704, a determination is made to whether there is an application related to the received notification. For example, system 208C can determine whether it includes an application related to the received notification. In this example, system 208C can determine that it includes (e.g., hosts) finance application 216 that is related to the notification. System 208C can make this determination, for example, by examining its own internal data structure that may indicate that web application 214 is dependent on data that is provided by finance application 216. In this case, execution of method 700 by system 208C can proceed to element 706. Furthermore, if this dependency is determined, then system 208C is expecting to perform an operation on finance application 216, as described below with reference to element 710. In one embodiment, even if there is a lock on this application, but this lock is for the same operation type as indicated by the notification, then operation can proceed to element 706.

In another example, system 208D can receive a similar notification from system 208B. However, system 208D can determine that it does not contain an application that is related to this notification. System 208D can thus determine that web application 214 is not dependent on data that is provided by database application 218. In this case, execution of method 700 by system 208D can stop. In one embodiment, even if there is an application related to the received notification, but this application has a lock on it, and this lock is for another operation type, then execution of method 700 by system 208D can stop. In one embodiment, even if there is an application related to the received notification, but this application has a lock on it, or a lock that is for another operation type, then execution of method 700 by system 208D can wait until this lock is released.

In 706, additional notification(s) are sent. In one embodiment, this additional notification can indicate that an operation is to be performed on the second application, without indicating the command. In another embodiment, this additional notification can inquire whether there is an application that that the second application is dependent on, without indicating the operation or the command. For example, with reference to FIG. 2B, the additional notification can be received by notification module 220D of system 208D. This additional notification can be sent by notification module 220C and/or notification controller 222. In one embodiment, a lock may be applied to the second application, that may indicate the type of operation to be performed on this second application.

In 708, method 700 waits on one or more responses to the additional notification(s). For example, notification module 220C can wait on response(s) from other systems (or notification controller 222). Notification module 220C may use a time-out, or another mechanism, to ensure that system 208C does not wait too long to perform the operation that is related to the notification received in element 702. For example, notification module 220C may wait for a pre-determined amount of time before performing this operation. For the purpose of the flowchart of method 700, a time-out, or another mechanism, may be interpreted by notification module 220C as a response to the notification.

In 710, if response(s) to the additional notification are received, then the operation(s) are performed on the second application. As noted above, if a dependency is determined in element 704, then a system receiving the notification of element 702 (e.g., system 208C) is expecting to perform a certain operation on the second application (e.g., finance application 216). For example, once response(s) to the additional notification(s) are received by notification module 220C, system 208C can initiate execution of finance application 216.

In 712, response(s) to the notification are sent. Each such response can thus indicate that the system receiving the notification of element 702 can provide data that is used by the application of the system sending that notification. In one embodiment, each such response can indicate that the operation (related to the notification received in element 702) has been performed. For example, a response to the notification received in element 702 can be sent by notification module 220C. This response can indicate that system 208C has initiated execution of finance application 216. This response can also indicate that data provided by finance application is ready to be used by web application module 214, such as when both applications are accessing data located in common storage.

Elements of network architecture can be implemented using different computer systems and networks. An example of one such network environment is described below with reference to FIG. 8.

Figure 8:
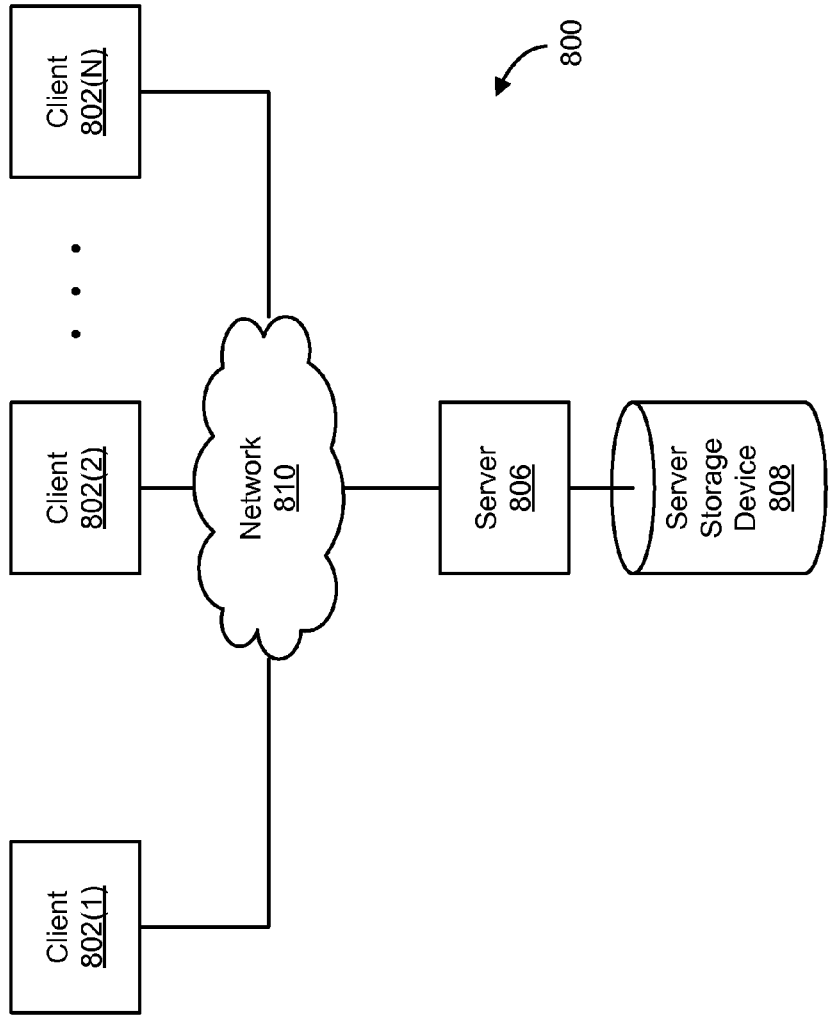
FIG. 8 is a block diagram illustrating a network architecture in which embodiments of the present application can be implemented.

FIG. 8 is a simplified block diagram illustrating a network architecture 800 in which one or more clients are provided with access to a server via various network connections. As depicted in FIG. 8, clients 802(1)-(N) are coupled to a network 810, and so are able to access a server 806 (which can be used to implement system(s) 208A-208D and/or notification controller 222) via network 810. Other servers (not shown) can be used instead to implement system(s) 208A-208D and/or notification controller 222). A client can be implemented using, for example, a desktop computer, a laptop computer, a workstation, a server, a cell phone, a smart phone, a networkenabled personal digital assistant (PDA), or the like. An example of network 810, which can be used by clients 802(1)-(N) to access server 806, is the Internet. Alternatively, access to server 806 can be provided by a local area network (LAN) utilizing Ethernet, IEEE 802.11x, or some other communications protocol. As will be appreciated, server 806 can be accessed by clients coupled directly thereto (not shown).

As also depicted on FIG. 8, server 806 is coupled to a server storage device 808, which includes a data volume such as cluster shared volume. Server storage device 808 can be implemented as a single storage device or a collection of storage devices. Server storage device 808 can also be implemented as a storage area network, which couples remote storage devices to a server (e.g., server 806), such that the remote storage devices appear as locally-attached storage devices to the server's OS, for example.

In light of the present disclosure, those of skill in the art will appreciate that server storage device 808 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 800 can include other components such as routers, firewalls and the like that are not germane to the discussion of the present network and will not be discussed further herein. Those of skill in the art will also appreciate that other configurations are possible. For example, clients 802(1)-(N) can be directly coupled to server storage device 808 without the user of a server or Internet; server 806 can be used to implement both the clients and the server; network architecture 800 can be implemented without the use of clients 802(1)-(N); and so on.

As an example implementation of network architecture 800, server 806, services requests to data generated by clients 802(1)-(N) to data stored in server storage device 808. Any of the applications of the multi-tier application can be implemented using one of the other servers in the manner illustrated by FIGS. 4-7.

Figure 9:
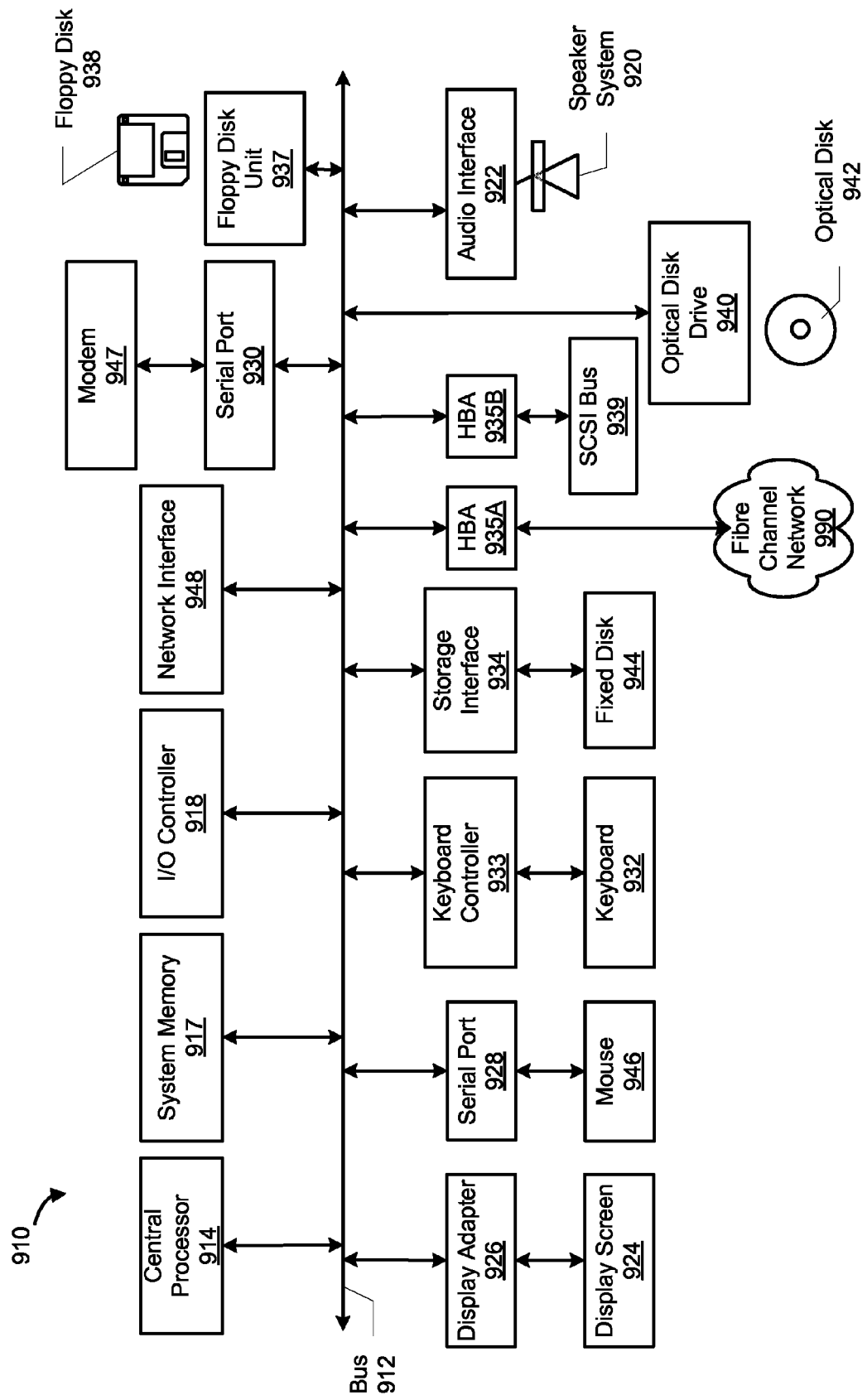
FIG. 9 is a block diagram that illustrates an example of a computer system suitable for implementing embodiments of the present application.

FIG. 9 depicts a block diagram of a computer system 910 suitable for implementing the present disclosure. Computer system 910 may be illustrative of various computer systems in the networked system 200B, such as system(s) 208A-208D and/or notification controller 222, among others. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code for the automatically performing operations on such applications based on their dependencies on other applications (such as described above with reference to the methods of FIGS. 4-7), etc., to implement the present disclosure can be stored in computer-readable storage media such as one or more of system memory 917, fixed disk 944, optical disk 942, or floppy disk 938. Memory 920 is also used for storing temporary variables or other intermediate information during the execution of instructions by the processor 910. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a command, wherein
      the command is configured to start a first application;
   determining whether the first application is configured to use data provided by a second application, wherein
      the determining whether the first application is configured to use the data is performed in response to the receipt of the command;
   determining whether the second application is configured to use other data provided by a third application, wherein
      the determining whether the second application is configured to use the other data is performed in response to a receipt of a notification, wherein the notification indicates that the second application is to be executed; and
   in response to a determination that the first application is configured to use the data and a determination that the second application is configured to use the other data,
      initiating execution of the third application,
      followed by initiating execution of the second application, and
      followed by initiating execution of the first application.

2. The method of claim 1, wherein
   the determining whether the first application is configured to use the data comprises:
      sending an initial notification, and
      the initial notification indicates the receipt of the command to start the first application.

3. The method of claim 2, wherein
   a first entity operates the first application,
   a second entity operates the second application,
      the second entity performs the determining whether the first application is configured to use the data provided by the second application, and
      the second entity performs the determining in response to a receipt of the initial notification.

4. The method of claim 3, wherein
   a third entity operates the third application,
      the third entity determines that the second application uses the other data from the third application, and
   the third entity performs the determination that the second application uses the other data from the third application in response to the receipt of the notification.

5. The method of claim 1, further comprising:
   determining dependencies between a plurality of applications, wherein
      the dependencies indicate that the first application of the plurality of applications is dependent on the second application of the plurality of applications at least by virtue of the first application using the data provided by the second application, and
      the determining the dependencies is performed in response to the receipt of the command.

6. The method of claim 5, wherein
   the initiating execution of the second application is based on the dependencies.

7. The method of claim 1, further comprising:
   applying a lock to the second application, wherein
      the applying is performed in response to the determination that the first application is configured to use the data provided by the second application,
      the lock indicates that the second application is associated with the command to start the first application,
      the lock prevents another action from being initiated on the second application,
      the another action is an action associated with another command, and
      the another command is a command other than the command to start the first application.

8. An apparatus, comprising:
   one or more processors;
   a first application, wherein
      the first application is configured to be executed using the one or more processors;
   a command module, wherein
      the command module is configured to receive a command to start the first application;
   a notification broadcast module, wherein
      the notification broadcast module is configured to determine whether the first application is configured to use data provided by a second application, wherein
      the notification broadcast module is configured to determine whether the first application is configured to use the data in response to the receipt of the command; and
      the notification broadcast module is further configured to determine whether the second application is configured to use other data provided by a third application, wherein
      the determining whether the second application is configured to use the other data is performed in response to a receipt of a notification, wherein the notification indicates that the second application is to be executed; and
   in response to a determination that the first application is configured to use the data and a determination that the second application is configured to use the other data,
      using the one or more processors to initiate execution of the third application,
      followed by using the one or more processors to initiate execution of the second application, and
      followed by using the one or more processors to initiate execution of the first application.

9. The apparatus of claim 8, wherein
   the notification broadcast module is further configured to receive a response notification,
   the response notification indicates that the second application is executing, wherein the first application is configured to be executed in response to receiving the response notification.

10. The apparatus of claim 9, wherein
    the response notification further indicates that the first application is dependent on the data provided by the second application.

11. The apparatus of claim 8, wherein
    the command module is further configured to receive a command to stop the first application,
    the notification broadcast module is further configured to send another notification,
    the another notification indicates the receipt of the command to stop the first application,
    the notification broadcast module is further configured to receive another response notification, and the another response notification indicates that the second application is dependent on the other data provided by the third application.

12. The apparatus of claim 11, wherein
the response notification further indicates that the third application is stopped in response to the notification broadcast module performing the sending of the another notification.

13. A non-transitory computer readable storage medium storing program instructions that are executable by one or more processors to:
receive a first command, wherein
the first command is to start a first application;
determine whether the first application is configured to use data provided by a second application, wherein
the determination whether the first application is configured to use the data is performed in response to the receipt of the first command;
determine whether the second application is configured to use other data provided by a third application, wherein
the determination whether the second application is configured to use the other data is performed in response to a receipt of a notification, wherein the notification indicates that the second application is to be executed; and
in response to a determination that the first application is configured to use the data and a determination that the second application is configured to use the other data,
initiate execution of the third application,
initiate execution of the second application, wherein the execution of the second application is initiated following the initiating execution of the third application, and
initiate execution of the first application, wherein the execution of the first application is initiated following the initiating execution of the second application.

14. The non-transitory computer readable storage medium of claim 13, wherein the program instructions are further executable to:
receive a response notification, wherein
the response notification indicates that the second application is executing; and
the response notification further indicates that the first application is dependent on the data from the second application.

15. The non-transitory computer readable storage medium of claim 14, wherein the program instructions are further executable to:
send a first notification, wherein
the first notification indicates the receipt of the first command to start the first application,
execute the first application, wherein
the first application is executed in response to the receipt of the response notification, and
the response notification further indicates that the second application is executing in response to the sending of the first notification.

16. The non-transitory computer readable storage medium of claim 14, wherein the program instructions are further executable to:
receive a second command, wherein
the second command is to stop the first application,
send another notification, wherein
the another notification indicates the receipt of the second command, and
the response notification further indicates that the second application is stopped in response to the sending of the another notification.

* * * * *